(12) United States Patent
Kobylinski

(10) Patent No.: US 9,335,916 B2
(45) Date of Patent: May 10, 2016

(54) PRESENTING AND ZOOMING A SET OF OBJECTS WITHIN A WINDOW

(75) Inventor: Krzysztof R. Kobylinski, Oshawa (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 843 days.

(21) Appl. No.: 12/424,422

(22) Filed: Apr. 15, 2009

(65) Prior Publication Data

US 2010/0269062 A1   Oct. 21, 2010

(51) Int. Cl.
G06F 3/048   (2013.01)
G06F 3/0485  (2013.01)
G06F 9/44    (2006.01)

(52) U.S. Cl.
CPC .......... *G06F 3/04855* (2013.01); *G06F 3/0485* (2013.01); *G06F 9/4443* (2013.01)

(58) Field of Classification Search
CPC .. G06F 3/04855; G06F 3/0485; G06F 9/4443
USPC ................... 715/788, 800, 781, 764
See application file for complete search history.

(56) References Cited

U.S. PATENT DOCUMENTS

| | | | | |
|---|---|---|---|---|
| 5,544,360 | A * | 8/1996 | Lewak et al. | |
| 5,640,553 | A * | 6/1997 | Schultz | |
| 5,765,108 | A * | 6/1998 | Martin et al. | 455/422.1 |
| 6,055,540 | A * | 4/2000 | Snow et al. | |
| 6,169,999 | B1 * | 1/2001 | Kanno | 715/255 |
| 6,205,456 | B1 * | 3/2001 | Nakao | 715/201 |
| 6,266,649 | B1 * | 7/2001 | Linden et al. | 705/7.29 |
| 6,493,713 | B1 * | 12/2002 | Kanno | |
| 6,628,304 | B2 | 9/2003 | Mitchell et al. | |
| 6,667,751 | B1 * | 12/2003 | Wynn | G06F 17/30876 707/E17.112 |
| 6,785,707 | B2 * | 8/2004 | Teeple | 709/203 |
| 6,823,331 | B1 * | 11/2004 | Abu-Hakima | 707/758 |
| 6,827,578 | B2 * | 12/2004 | Krebs et al. | 434/118 |
| 6,876,496 | B2 * | 4/2005 | French | A63B 24/0003 359/629 |
| 6,942,146 | B2 * | 9/2005 | Pfutzenreuter | G06Q 10/087 235/375 |
| 6,944,612 | B2 * | 9/2005 | Roustant et al. | 707/706 |

(Continued)

FOREIGN PATENT DOCUMENTS

WO        2008120338 A1    10/2008

OTHER PUBLICATIONS

Amazon web page (see http://web.archive.org/web/20080414124922/http://www.amazon.com/magazine-newspaper-subscriptions/b?ie=UTF8&node=599858; dated Apr. 14, 2008).*

(Continued)

*Primary Examiner* — Jung-Mu Chuang
(74) *Attorney, Agent, or Firm* — Patterson & Sheridan, LLP

(57) ABSTRACT

Systems, methods and articles of manufacture are disclosed for presenting a plurality of objects within a display area on a graphical display device. The size of the display area may be received. A plurality of categories may be generated based on the plurality of objects and the received size. A plurality of labels may be generated for the plurality of categories, the labels describing the objects associated with each category. The plurality of categories may be output for display within the display area. The plurality of categories may also form a hierarchy. Commands may be provided for navigating the hierarchy. A user may conveniently and efficiently view, browse, and select the plurality of objects using the hierarchy and the provided commands.

21 Claims, 11 Drawing Sheets

(56) References Cited

U.S. PATENT DOCUMENTS

| | | | |
|---|---|---|---|
| 6,981,218 B1* | 12/2005 | Nagao | 715/234 |
| 6,990,637 B2* | 1/2006 | Anthony et al. | 715/851 |
| 7,028,312 B1* | 4/2006 | Merrick et al. | 719/330 |
| 7,188,320 B1* | 3/2007 | Landers | G06F 3/0482 455/416 |
| 7,242,809 B2* | 7/2007 | Hunter et al. | 382/224 |
| 7,685,531 B2* | 3/2010 | Yeung et al. | 715/769 |
| 7,743,059 B2* | 6/2010 | Chan et al. | 707/737 |
| 7,778,966 B2* | 8/2010 | Balassanian | 707/610 |
| 8,095,892 B2* | 1/2012 | Anthony et al. | 715/851 |
| 8,239,882 B2* | 8/2012 | Dhanjal et al. | 719/319 |
| 8,255,828 B2* | 8/2012 | Harris et al. | 715/810 |
| 8,301,487 B2* | 10/2012 | Rapperport et al. | 705/7.35 |
| 8,306,975 B1* | 11/2012 | Eldering | 707/732 |
| 8,364,670 B2* | 1/2013 | Peckover | 707/728 |
| 8,451,278 B2* | 5/2013 | Geisner | G06F 3/011 345/474 |
| 8,701,046 B2* | 4/2014 | McCann et al. | 715/853 |
| 8,775,595 B2* | 7/2014 | Leacock | H04L 51/043 709/203 |
| 9,063,578 B2* | 6/2015 | Bailey | G06F 3/0346 |
| 2002/0032696 A1* | 3/2002 | Takiguchi | G06F 17/30126 715/255 |
| 2002/0147741 A1* | 10/2002 | Hashimoto | 707/500 |
| 2003/0018620 A1* | 1/2003 | Vishnubhotla | 707/3 |
| 2003/0050931 A1* | 3/2003 | Harman et al. | 707/100 |
| 2003/0052925 A1* | 3/2003 | Daimon et al. | 345/810 |
| 2003/0115207 A1* | 6/2003 | Bowman | G06F 17/30398 |
| 2003/0142953 A1* | 7/2003 | Terada et al. | 386/46 |
| 2003/0177000 A1* | 9/2003 | Mao et al. | 704/9 |
| 2004/0093321 A1* | 5/2004 | Roustant et al. | 707/3 |
| 2004/0193591 A1* | 9/2004 | Winter | 707/3 |
| 2005/0060287 A1* | 3/2005 | Hellman et al. | 707/2 |
| 2005/0080770 A1* | 4/2005 | Lueder | G06F 3/0481 |
| 2005/0091596 A1* | 4/2005 | Anthony et al. | 715/712 |
| 2005/0246663 A1* | 11/2005 | Yeung et al. | 715/851 |
| 2005/0289482 A1* | 12/2005 | Anthony et al. | 715/851 |
| 2006/0036965 A1* | 2/2006 | Harris et al. | 715/777 |
| 2006/0059441 A1* | 3/2006 | Todd | 715/853 |
| 2007/0008321 A1* | 1/2007 | Gallagher et al. | 345/473 |
| 2007/0083810 A1* | 4/2007 | Scott et al. | 715/525 |
| 2007/0260625 A1* | 11/2007 | Tien et al. | 707/101 |
| 2007/0260630 A1* | 11/2007 | Balassanian | 707/102 |
| 2008/0040382 A1* | 2/2008 | Morris et al. | 707/102 |
| 2008/0126264 A1* | 5/2008 | Tellefsen et al. | 705/80 |
| 2008/0243638 A1* | 10/2008 | Chan et al. | 705/27 |
| 2008/0249995 A1* | 10/2008 | Balassanian | 707/3 |
| 2009/0055390 A1* | 2/2009 | Maeda et al. | 707/5 |
| 2009/0085921 A1* | 4/2009 | Do et al. | 345/543 |
| 2009/0132965 A1* | 5/2009 | Shimizu | 715/853 |
| 2009/0259523 A1* | 10/2009 | Rapperport | G06Q 10/04 705/7.35 |
| 2009/0276716 A1* | 11/2009 | Chua | 715/744 |
| 2010/0017709 A1* | 1/2010 | Wakai | G06F 17/30861 715/273 |
| 2010/0042953 A1* | 2/2010 | Stewart et al. | 715/854 |
| 2010/0057693 A1* | 3/2010 | Himstedt et al. | 707/3 |
| 2010/0287512 A1* | 11/2010 | Gan et al. | 715/854 |

OTHER PUBLICATIONS

PCT Search Report and Written Opinion for PCT/EP2010/053773 dated Jun. 28, 2010.

* cited by examiner 304    300

368
370
372
374
366  376
378
380

□ 🗁 Set
  ⊞ 🗁 Acc...Bil
  ⊞ 🗁 BillS...Colla
  ⊞ 🗁 Clo...Deb
  ⊞ 🗁 Deb...For       350
  ⊞ 🗁 For...Leg  — 352
  ⊞ 🗁 Leg...Num
  ⊞ 🗁 Num...Prc
  ⊞ 🗁 Prc...Ski
  ⊞ 🗁 Ski...Web
  ⊞ 🗁 Web...Xfe

354

368
370
372
374
366  376
378
380

□ 🗁 For...Leg
  ⊞ 🗁 For...Gen
  ⊞ 🗁 Gen...Hol
  ⊞ 🗁 Hol...Inc
  ⊞ 🗁 Inc...Ind        356
  ⊞ 🗁 IncA...IncE
  ⊞ 🗁 Ind...Inv  — 358
  ⊞ 🗁 Inv...Iss
  ⊞ 🗁 IssS...Last
  ⊞ 🗁 Las...Leg
  ⊞ 🗁 LastP...LastY

360

368
370
372
374
366  376
378
380

□ 🗁 Inc...Ind
  — IncEndrsmntStmp_Type
  — IncExtBal_Type
  — IncExtBalance_Type
  — IncHistory_Type        362
  — IncImages_Type
  — IncSecondSigLine_Type — 364
  — IncSecSigLine_Type
  — IncSummary_Type
  — IncToken_Type
  — IndustNumber_Type

FIG. 3E

PRESENTING AND ZOOMING A SET OF OBJECTS WITHIN A WINDOW

BACKGROUND OF THE INVENTION

1. Field of the Invention

The field of the invention relates to user interfaces. More specifically, the field of the invention relates to presenting a plurality of objects within a display area of a graphical display.

2. Description of the Related Art

Early computer systems used command-line operating systems and software applications. These command-based systems provided a user interface that required the user to memorize a relatively large number of commands in order to perform meaningful work. The user interfaces for these command-driven computer programs required a relatively high level of skill to operate, and were not considered to be "user-friendly." With the introduction of the IBM personal computer (PC), computers became more widely available, both in the workplace and in homes, and the computer industry soon recognized the need to provide more user-friendly interfaces to computer programs. As a result, many different operating systems were introduced that provided a graphical user interface (GUI). Software applications with graphical user interfaces soon followed, and the vast majority of computer programs running on personal computers today provide a user-friendly GUI.

A GUI provides a user with a graphical and intuitive display of information. Typically, the user interacts with a GUI display using a graphical selection pointer, which a user controls utilizing a graphical pointing device, such as a mouse, track ball, joystick, or the like. Depending upon the actions allowed by the application of operating system software, the user can select a widget by positioning the graphical pointer over the widget and depressing a button associated with the graphical pointing device. A widget is a user-discernible feature of the graphic display, such as a window, icon, menu, or object. A window may fill the entire display, or the display may be split into a number of different windows. Further, a window may in turn include a number of different widgets, which may be different areas that display text, drop-down lists, text entry fields, buttons, etc.

SUMMARY OF THE INVENTION

One embodiment of the invention includes a computer-implemented method comprising configuring one or more computer processors to perform an operation. The operation may generally include receiving a request to display a list of a plurality of objects in a display window on a graphical display device, the display window having an insufficient size to display all of the objects in the list simultaneously; determining a maximum number of elements which can be displayed simultaneously in the display window; generating a plurality of categories equal to the maximum number of elements which can be displayed simultaneously in the display window; distributing each of the plurality of objects to one of the generated categories; and outputting, in response to the request, a list of the generated plurality of categories for display within the display window on the graphical display device.

Another embodiment of the invention includes a computer program product comprising a computer usable medium having computer usable program code. The computer usable program code may generally be configured to receive a request to display a list of a plurality of objects in a display window on a graphical display device, the display window having an insufficient size to display all of the objects in the list simultaneously; determine a maximum number of elements which can be displayed simultaneously in the display window; generate a plurality of categories equal to the maximum number of elements which can be displayed simultaneously in the display window; distribute each of the plurality of objects to one of the generated categories; and output, in response to the request, a list of the generated plurality of categories for display within the display window on the graphical display device.

Still another embodiment of the invention includes a system having a processor and a memory containing a program, which when executed by the processor is configured to perform an operation. The operation may generally include receiving a request to display a list of a plurality of objects in a display window on a graphical display device, the display window having an insufficient size to display all of the objects in the list simultaneously; determining a maximum number of elements which can be displayed simultaneously in the display window; generating a plurality of categories equal to the maximum number of elements which can be displayed simultaneously in the display window; distributing each of the plurality of objects to one of the generated categories; and outputting, in response to the request, a list of the generated plurality of categories for display within the display window on the graphical display device.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIGS. 3A-3F illustrate a GUI view of an object presenter, according to one embodiment of the invention.

DETAILED DESCRIPTION OF THE PREFERRED EMBODIMENTS

Figure 1:
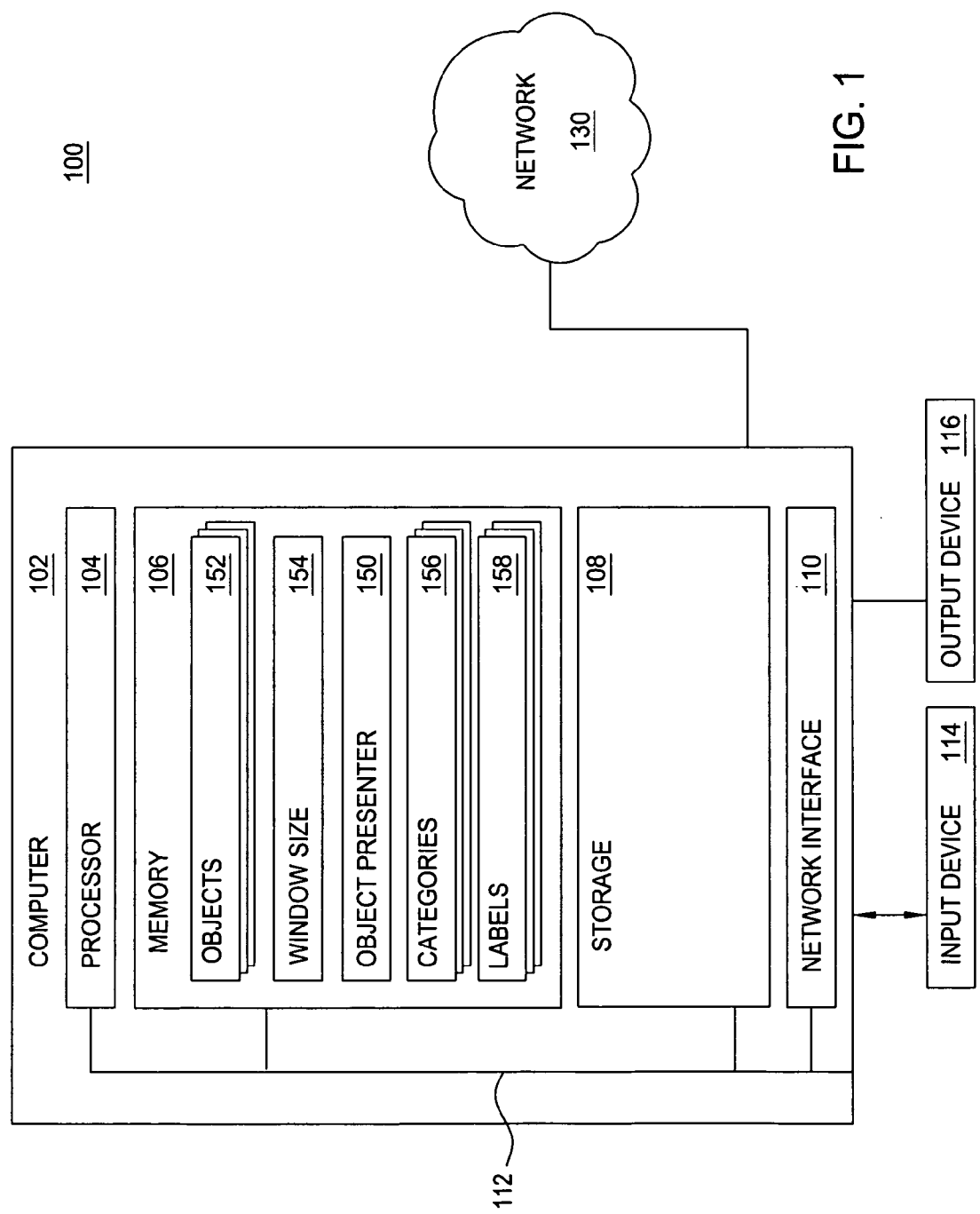
FIG. 1 is a block diagram illustrating a system for presenting a plurality of objects within a window, according to one embodiment of the invention.

Embodiments of the present invention generally present a plurality of objects within a display area on a graphical display device. One embodiment of the invention includes configuring a hardware processor to execute an object presenter application. The object presenter application may receive a plurality of objects and a size of the display area. Further, the object presenter application may generate a plurality of categories based on the plurality of objects and received size. The object presenter application may also generate a label for each category, the labels describing the objects associated with each category. Further, the plurality of categories may also form a hierarchy. The object presenter may also provide one or more commands for navigating the hierarchy. A user may conveniently and efficiently view, browse, and select the plurality of objects using the hierarchy and the provided commands.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a block diagram illustrating a system 100 for presenting a plurality of objects within a window size, according to one embodiment of the invention. The networked system 100 includes a computer 102. As shown, the computer 102 is connected to other computers via a network 130. In general, the network 130 may be a telecommunications network and/or a wide area network (WAN). In a particular embodiment, the network 130 is the Internet.

The computer 102 generally includes a processor 104 connected via a bus 112 to a memory 106, a network interface device 110, a storage 108, an input device 114, and an output device 116. The computer 102 is generally under the control of an operating system (not shown). Examples of operating systems include UNIX, versions of the Microsoft® Windows® operating system, and distributions of the Linux® operating system. (Note: Linux is a registered trademark of Linus Torvalds in the United States, other countries, or both. And Microsoft and Windows are trademarks of Microsoft Corporation in the United States, other countries, or both.) More generally, any operating system supporting the functions disclosed herein may be used.

The memory 106 may be a random access memory. While the memory 106 is shown as a single entity, it should be understood that the memory 106 may in fact comprise a plurality of modules, and that the memory 106 may exist at multiple levels, from high speed registers and caches to lower speed but larger DRAM chips.

The network interface device 110 may be any entry/exit device configured to allow network communications between the computer 102 and other computers via the network 130. For example, the network interface device 110 may be a network adapter or other network interface card (NIC).

The storage 108 may be a hard disk drive storage device. Although the storage 108 is shown as a single unit, the storage 108 may be a combination of fixed and/or removable storage devices, such as fixed disc drives, floppy disc drives, tape drives, removable memory cards, or optical storage. The memory 106 and the storage 108 may be part of one virtual address space spanning multiple primary and secondary storage devices.

The input device 114 may be any device for providing input to the computer 102. For example, a keyboard, keypad, light pen, touch-screen, track-ball, or speech recognition unit, audio/video player, and the like may be used.

The output device 116 may be any device for providing output to a user of the computer 102. For example, the output device 116 may be any conventional display screen or set of speakers, along with their respective interface cards, i.e., video cards and sound cards (not shown). Although shown separately from the input device 114, the output device 116 and input device 114 may be combined. For example, a display screen with an integrated touch-screen, a display with an integrated keyboard, or a speech recognition unit combined with a text speech converter may be used.

As shown, the memory 106 of the computer 102 includes objects 152, a window size 154, an object presenter 150, categories 156, and labels 158. FIGS. 2 through 6 and associated descriptions detail the structure and operation of the object presenter 150 running on the computer 102.

Although embodiments are described herein with reference to a client-server network model, network models other than client-server, such as peer-to-peer, are broadly contemplated.

Figure 2:
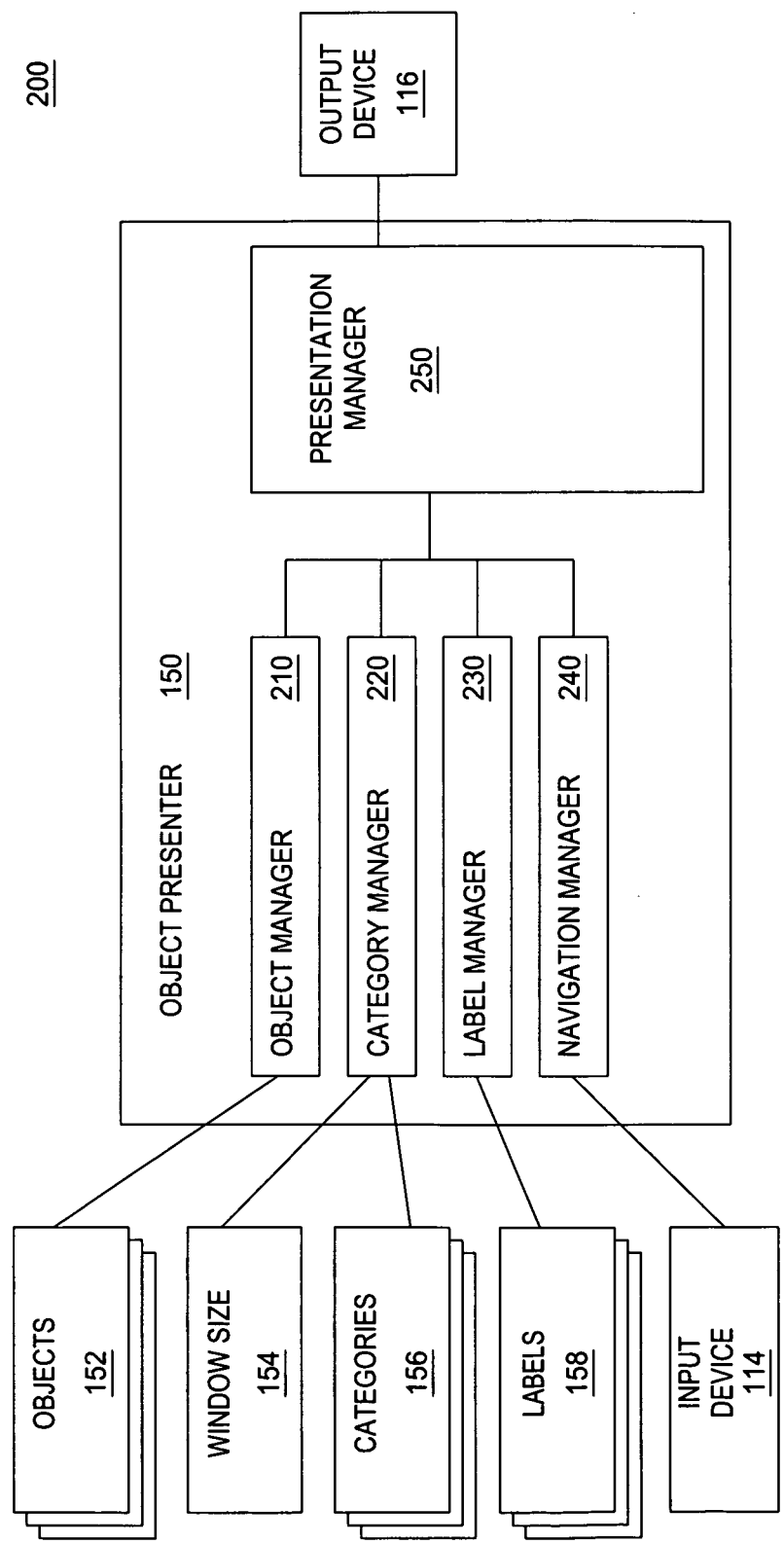
FIG. 2 is a block diagram illustrating components of the object presenter 150 of FIG. 1, according to one embodiment of the invention.

FIG. 2 is a block diagram 200 illustrating components of the object presenter 150 of FIG. 1, according to one embodiment of the invention. As shown, the object presenter 150 includes an object manager 210, a category manager 220, a label manager 230, a navigation manager 240, and a presentation manager 250.

In one embodiment, the object presenter 150 presents a plurality of objects 152 within a display area on a graphical display. A display area may also be referred to herein as a window. The object manager 210 receives a plurality of objects 152. The plurality of objects 152 may be any collection of discrete items capable of being displayed on the graphical display. Examples of the discrete items include text strings. For instance, the plurality of objects 152 may include filenames, table names, category names, or names of people. Table I provides an example of objects 152, in this case a list of database table names:

TABLE I

Objects example

| Object ID | Object (table name) |
|---|---|
| 1 | AcceptReqd_Type |
| 2 | AcctCur_Type |
| 3 | AcctFormat_Type |
| 4 | AcctHelpMsg_Type |
| 5 | AcctId_Type |
| 6 | AcctKey_Type |
| 7 | AcctMask_Type |
| 8 | AcctPayAcct_Type |
| 9 | AcctPayAcctId_Type |
| 10 | AcctRestrictMsg_Type |
| ... | ... |
| 1000 | Xfer_Type |

In this specific example, the database includes one thousand named tables. Each table name (such as "AcceptReqd_Type") is associated with an object identifier (such as "1"). In one embodiment, the object manager 210 receives a plurality of objects 152 ordered according to predefined criteria (such as alphabetically by name). Alternatively, the object manager 210 may sort the plurality of objects 152. For example, the object manager 210 may sort a plurality of unordered objects 152 in alphabetical order by name. In another example, the object manager 210 may receive objects 152 in alphabetical order and sort the plurality of objects 152 in reverse alphabetical order. The object manager 210 may define the criteria based on user input.

In one embodiment, the category manager 220 receives a window size 154. The window size 154 specifies a size of a window in which the object presenter 150 may display the objects 152. For example, the category manager 220 could receive a window size 154 of "320×200", i.e., three hundred and twenty pixels by two hundred pixels. The window size may specify the size of a window on a graphical display device (such as a computer monitor, a display for a personal digital assistant (PDA), a cell phone display, etc.). In one embodiment, the category manager 220 may receive the window size 154 via a function call. For example, the function may be provided by an operating system, windowing system, or window manager as part of an Application Programming Interface (API), such as in a widget toolkit (also known as a widget library). Examples of widget toolkits include Swing, Abstract Window Toolkit (AWT), Qt®, the GIMP Toolkit (GTK+), and Microsoft Foundation Classes (MFC).

In one embodiment, the category manager 220 determines a maximum number of rows that may be displayed simultaneously within a window having the window size 154. Each row may display one of the objects or a reference to a category of objects. For example, suppose that the window has a height of 200 pixels. Further, suppose that displaying a single object requires a height of twenty pixels. In such a case, the category manager 220 could determine that a maximum of ten rows may be simultaneously displayed in the form of a list within the window.

In one embodiment, the category manager 220 may generate a plurality of categories 156 based on the objects 152, the window size 154, and the maximum number of rows. Table II shows an example of a set of categories generated for 1000 database table names:

TABLE II

Categories example

| Category | Associated objects |
|---|---|
| Category 1 | Object ID 1-100 |
| Category 2 | Object ID 101-200 |
| Category 3 | Object ID 201-300 |
| ... | ... |
| Category 10 | Object ID 901-1000 |

In this specific example, the category manager 220 generates ten categories determined from the maximum number of rows. That is, the category manager 220 generates the maximum number of categories that may be displayed simultaneously within a window having a window size of 200 pixels in height. In this specific example, displaying a category requires the same height as displaying an object, i.e., a height of twenty pixels. Further, the category manager 220 may associate each category 156 with a subset of the objects. For example, as shown in Table II, the category manager 220 associates "Category 1" with objects having an Object ID of 1 through 100. Thus, the subset of objects in category 1 includes objects having an Object ID of 1 through 100.

Other ways of generating a predefined number of categories 156 are broadly contemplated. For example, if displaying a category requires a different height as displaying an object, then the category manager 220 may determine a maximum number of categories that may be displayed simultaneously within a window having the window size 154. The category manager 220 may then generate a plurality of categories 156 based on the objects 152, the window size 154, and the maximum number of categories.

In another embodiment, the category manager 220 generates a predefined number of categories 156. For example, the category manager 220 may generate twenty-six categories, each category representing a different letter of the English alphabet. In another embodiment, the category manager 220 generates a plurality of categories 156 based on only the objects 152 and without regard to the window size 154 or the maximum number of rows. For example, the category manager 220 may generate ten times fewer categories than the number of objects 152 (e.g., one hundred categories for one thousand objects, thereby reducing the number of items for display by tenfold).

In one embodiment, the label manager 230 generates a label 158 for each category. For example, the label manager 230 may generate a label based on objects 152 associated with the respective category 156. Table III shows an example of labels generated for the 1000 database tables:

TABLE III

Labels example

| Category | Associated objects | Label |
|---|---|---|
| Category 1 | Object ID 1-100 | Acc . . . Bil |
| Category 2 | Object ID 101-200 | Bil . . . Clo |
| Category 3 | Object ID 201-300 | Clo . . . Deb |
| . . . | . . . | . . . |
| Category 10 | Object ID 901-1000 | Web . . . Xfe |

In this specific example, the label manager 230 generates a label (such as "Acc . . . Bil") for each category (such as Category 1) based on objects associated in that category (such as "Object ID 1-100"). For example, suppose "Object ID 1" is "AcceptReqd_Type" and "Object ID 100" is "Billing_Type"—the first and last objects in this subcategory. The label manager 230 may generate a label 158 for Category 1 based on the first three letters of "AcceptReqd_Type" (i.e., "Acc") and the first there letters of "Billing_Type" (i.e., "Bil"), resulting in "Acc . . . Bil". The generated label 158 for Category 1 indicates that Category 1 represents objects ranging from "Acc . . . " to "Bil . . . ". Other ways of generating a label 158 for a category 156 are broadly contemplated.

In one embodiment, the navigation manager 240 navigates the objects 152 and the categories 156 based on user input. For example, the navigation manager 240 may receive a user request to expand a category 156 (such as Category 1). In one embodiment, the navigation manager 240 may display all objects 152 associated with the category 156 (i.e., Object ID 1-100) within a window. If the window is too small to display all associated objects 152 simultaneously, the navigation manager 240 may provide a mechanism for the user to scroll through the associated objects 152 (e.g., using a vertical scroll bar).

In another embodiment, the navigation manager 240 determines whether the number of associated objects 152 is greater than the maximum number of rows that may be displayed simultaneously within the window. Suppose the maximum number of rows is ten. Further, suppose that a user requests to expand Category 1. If Category 1 is associated with ten or fewer objects, the navigation manager 240 may display all of the associated objects simultaneously in the window (i.e., without the need for scrolling or having a scroll bar). However, if Category 1 is associated with more than ten objects, the category manager 220 may generate one or more categories 156 representing the greater than ten objects. The number of the one or more categories 156 may be fewer than or equal to the maximum number of rows. Suppose Category 1 is associated with twenty-one objects. The category manager 220 may generate three categories 156 representing the twenty-one objects, including a first category that represents the first ten objects, a second category that represents the next ten objects, and a third category that represents the last object.

Other distributions of objects 152 into categories 156 are broadly contemplated. For example, the category manager 220 may also generate three categories 156 representing the twenty-one objects 152, each category representing seven objects 152.

Taken together, Category 1, the three generated categories, and the twenty-one objects form a hierarchy (specifically, a tree). That is, Category 1 may be referred to as a "parent category" of the three generated categories ("child categories" of Category 1). Further, the three generated categories may also be referred to as "sibling categories"). Further, the three generated categories may be referred to as "child" categories. Each child category may also be referred to as a "sub-category." Further still, the twenty-one objects may be referred to as "children objects" of the three generated categories. Table IV shows exemplary sub-categories for Category 1 for a plurality of one thousand objects:

TABLE IV

Sub-categories example

| Category | Associated sub-category | Associated objects |
|---|---|---|
| Category 1 | Sub-category 1 | Object ID 1-10 |
| Category 1 | Sub-category 2 | Object ID 11-20 |
| Category 1 | Sub-category 3 | Object ID 21-30 |
| . . . | . . . | . . . |
| Category 1 | Sub-category 10 | Object ID 91-100 |

In this specific example, the navigation manager 240 receives a user request to expand Category 1, which represents one hundred objects. Because one hundred objects cannot be displayed simultaneously within the window (which can display a maximum of ten objects simultaneously), the category manager 220 generates ten sub-categories 156 for the one hundred objects associated with Category 1, each sub-category representing ten objects (e.g., Sub-category 1 represents Object IDs 1-10). The label manager 230 may also generate labels 158 for each sub-category 156. For example, the label manager 230 may generate a label "Acce . . . Acct" for Sub-category 1. The navigation manager 240 then waits for a user to request to expand one of the sub-categories 156. For example, if the user requests to expand Sub-category 1, the navigation manager 240 may output the first ten objects of Table I to the presentation manager 250 for simultaneous display within the window of specified size 154.

In one embodiment, the object presenter 150 generates categories 156 dynamically (i.e., in response to user input) to facilitate navigating the objects being displayed in the interface. Further, the object presenter 150 may limit the number of categories it generates to the maximum number of rows that may be displayed simultaneously in a window of a given size. By not generating more categories than the maximum number of rows, the object presenter 150 need not include a scroll bar as part of a graphical user interface, even when the number of objects is large. For example, a user need not scroll through a list of ten thousand objects 152 in a window that only displays ten objects at a time. Instead, the object presenter 150 may generate a four-level hierarchy of categories (with the first level including a single root node; the hierarchy is five-levels if the objects are included), each category having ten children. A user may more conveniently and efficiently locate, view, select, etc., a specific object of the ten thousand objects 152 (e.g., by selecting a desired category from at most ten categories at a time, based on the labels 158; and without having to scroll through ten thousand objects 152). Further, GUI widgets may exhibit poor response time when receiving a large number of objects. For example, a selection list widget may take minutes to receive ten thousand object names for display. Thus, the object presenter 150 may present and navigate the plurality of objects 152 within a window of specified size 154 in a manner more convenient and efficient to a user.

Suppose, for example, a user is selecting a set of database tables to replicate from a large database schema. In such a case, a user may need to specify each table to replicate. However, the number of tables of a database may be large, e.g., one thousand tables. Scrolling up and down through a list of one thousand tables in a small window in order to select each next table may be inconvenient, inefficient, or even impractical. Instead, an object presenter 150 may be provided. The object presenter 150 may generate a hierarchy of categories 156. The object presenter 150 may also generate a plurality of labels 158 for the categories 156, each label 158 describing objects 152 associated with each respective category 156. The object presenter 150 may present a maximum of ten categories 156 (or sub-categories 156) at a time to the user. The user may conveniently and efficiently view, select, and browse objects 152 using the hierarchy. Further, the user may also visualize the density of objects 152 across the entire set (i.e., the entire plurality of objects 152). For example, if the category "Acc . . . Bil" represents one hundred objects 152, a user may recognize that exactly one hundred objects fall within an alphabetical range of "Acc . . . " to "Bil . . . ".

In one embodiment, the object presenter 150 may generate categories 156 only in response to user input. For example, the object presenter 150 need not generate sub-categories of Category 2 if the user requests to expand Category 1. Only upon receiving a user request to expand Category 2 does the object presenter 150 generate sub-categories of Category 2, according to one embodiment. By generating categories only upon user request, the object presenter 150 may more efficiently present the plurality of objects 152 within a window of specified size 154. In one embodiment, the object presenter 150 may also determine a number of levels of the hierarchy based on the number of objects 152 and the maximum number of rows that may be displayed simultaneously in a window of a given size (e.g., based on the ratio of the latter to the former).

In one embodiment, the user interface may include commands for navigating and selecting categories 156 and objects 152 in a display. Table V shows an example set of commands used to navigate a large number of list elements displayed in an interface without using a scroll-bar. The set of commands of Table V are described in conjunction with a slider widget 378 and buttons 368, 370, 372, 374, 380 of FIG. 3E:

TABLE V

Navigation Commands Example

| ID | Command | User input |
|---|---|---|
| 1 | Expand a category | Double-click a category |
| 2 | Specify a level in the hierarchy | Slider widget 378 |
| 3 | Go down a level in the hierarchy | Click button 374 |
| 4 | Go up a level in the hierarchy | Click button 380 |
| 5 | Go to the highest level in the hierarchy | Click button 370 |
| 6 | Go to the lowest level in the hierarchy | Keystroke: CTRL + L |
| 7 | Go to the previous sibling in the hierarchy | Click button 368 |
| 8 | Go to the next sibling in the hierarchy | Click button 372 |

In this specific example, the navigation manager 240 supports a plurality of commands. For example, the navigation manager 240 may define the plurality of commands, according to one embodiment. The navigation manager 240 may also associate each command with user input (e.g., a keystroke, clicking a GUI button, etc.). For example, the navigation manager 240 may expand Category 1 (i.e., present objects associated with Category 1 and/or present sub-categories of Category 1) if the user double-clicks category 1. As a further example, the navigation manager 240 may expand a category at the lowest level in the hierarchy (e.g., by starting at the selected category and navigating through the middle subcategory at each level of the hierarchy during descent in the hierarchy) if the user inputs a predefined keystroke (such as CTRL+L). In one embodiment, the navigation manager 240 may also customize the keystroke based on user input.

In one embodiment, the presentation manager 250 outputs objects 152, categories 156, and labels 158 for display in a window having a window size 154 on the output device 116. The window may be also resized (e.g., by a user, by an operating system, etc.). If the window is resized, the presentation manager 250 may output objects 152, categories 156, and labels 158 based on the resized window. For example, if the window is resized from 320×200 to 320×180 (i.e., only nine objects may be displayed simultaneously in the newly resized window, instead of ten objects), the object presenter 150 may replace ten categories 156 with nine newly-generated categories 156 for display within the resized window. The newly-generated categories 156 may also include newly-generated labels 158 that reflect an updated distribution of objects within the nine categories based on the resized window. That is, the object presenter 150 may dynamically generate categories 156 based on the window being resized.

Figure 3A:
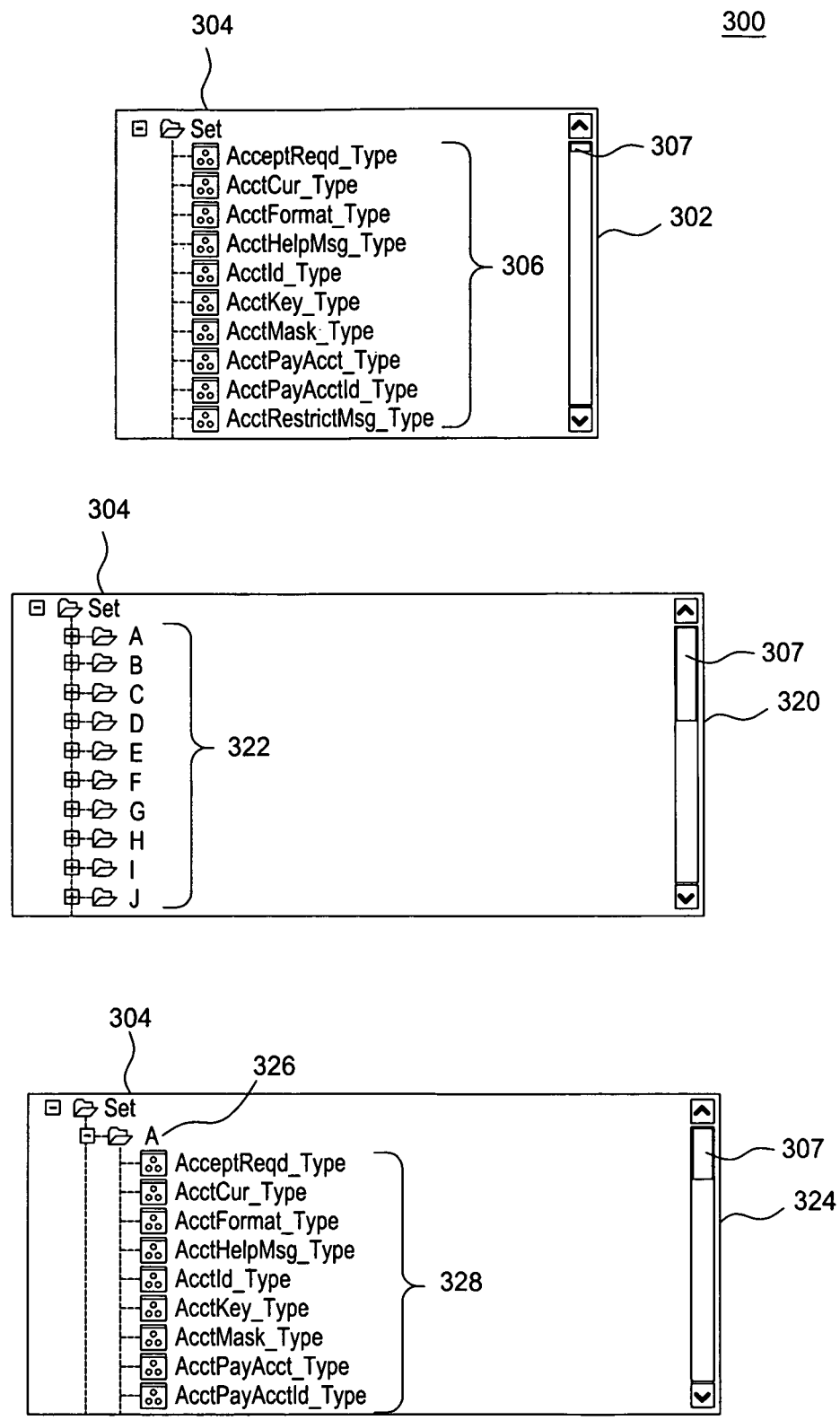

FIGS. 3A-3F illustrate GUI views 300 generated by the object presenter 150 of FIG. 1, according to one embodiment. As shown in FIG. 3A, a window 302 includes a simple list of 1000 objects, with the first ten elements of the list being displayed. Further, the window 302 includes a scroll bar 307 which allows a user to navigate through one thousand objects 306 within the window 302. Rather than simply display large lists in this manner, the object presenter 150 may generate a plurality of categories 156 based on the objects 306. For example, FIG. 3A shows a window 320 that includes a plurality of twenty-six categories 322 (one for each letter of the English alphabet). Further, the size of scroll bar 307 in window 320 is larger than the scroll bar 307 of window 302—indicating that the list has substantially fewer elements. Thus, a user may more easily navigate the twenty-six categories 322 than the one thousand objects 306. Further, generating window 320 to display twenty-six categories may be more efficient and result in improved response time compared to generating window 302, which must retrieve, display, and order the full one thousand objects 306 in window 302.

Figure 3B:
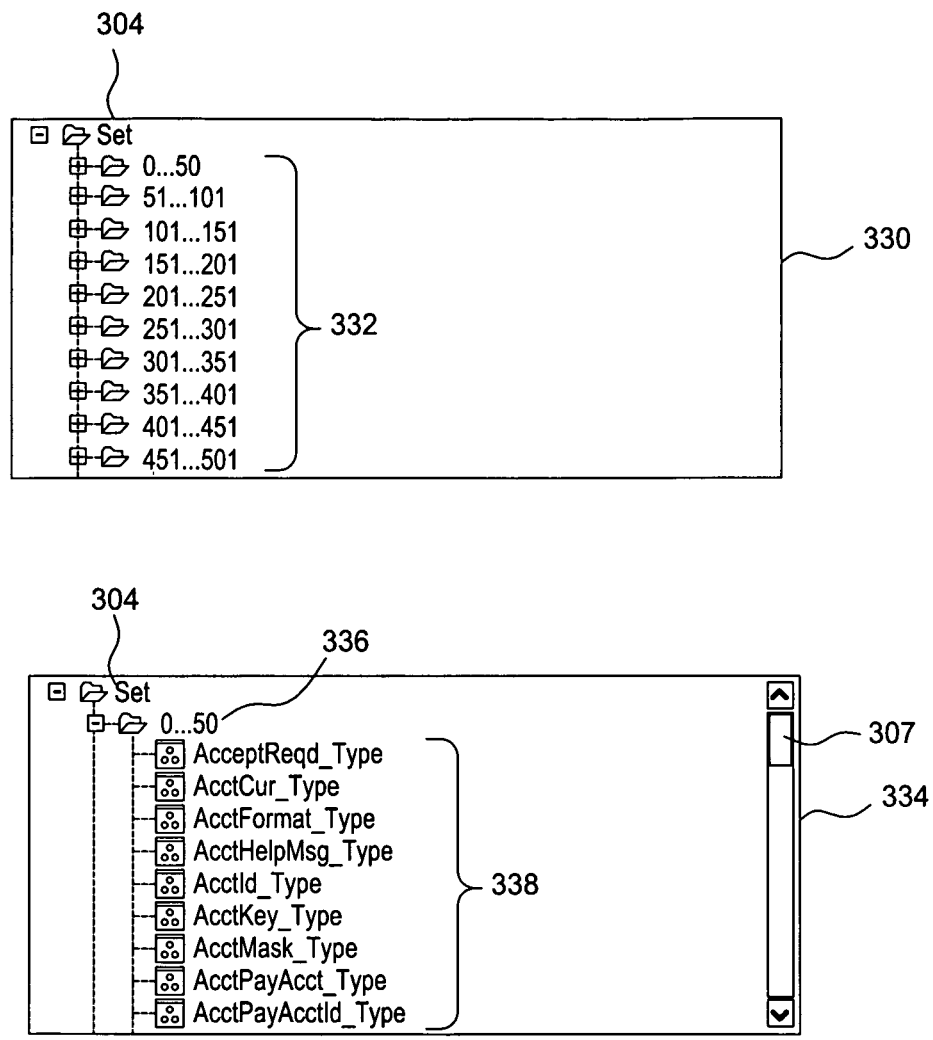

In one embodiment, the object presenter 150 may expand a category 322 based on user input. As shown in FIG. 3A, for example, the object presenter 150 may present objects 328 associated with the expanded category 326 (i.e., the category with elements beginning with the letter A) within a window 324. Further, other ways of generating categories 322 are broadly contemplated. For example, FIG. 3B shows a window 330 that includes categories 332 generated by numbering the one thousand objects 306 (rather than the names of the objects 306 as depicted in FIG. 3A in window 320). FIG. 3B also shows a window 334 that includes the objects 338 associated with an expanded category 336 (i.e., "Category 0 . . . 50"). That is, window 334 shows the first 50 objects.

Figure 3C:
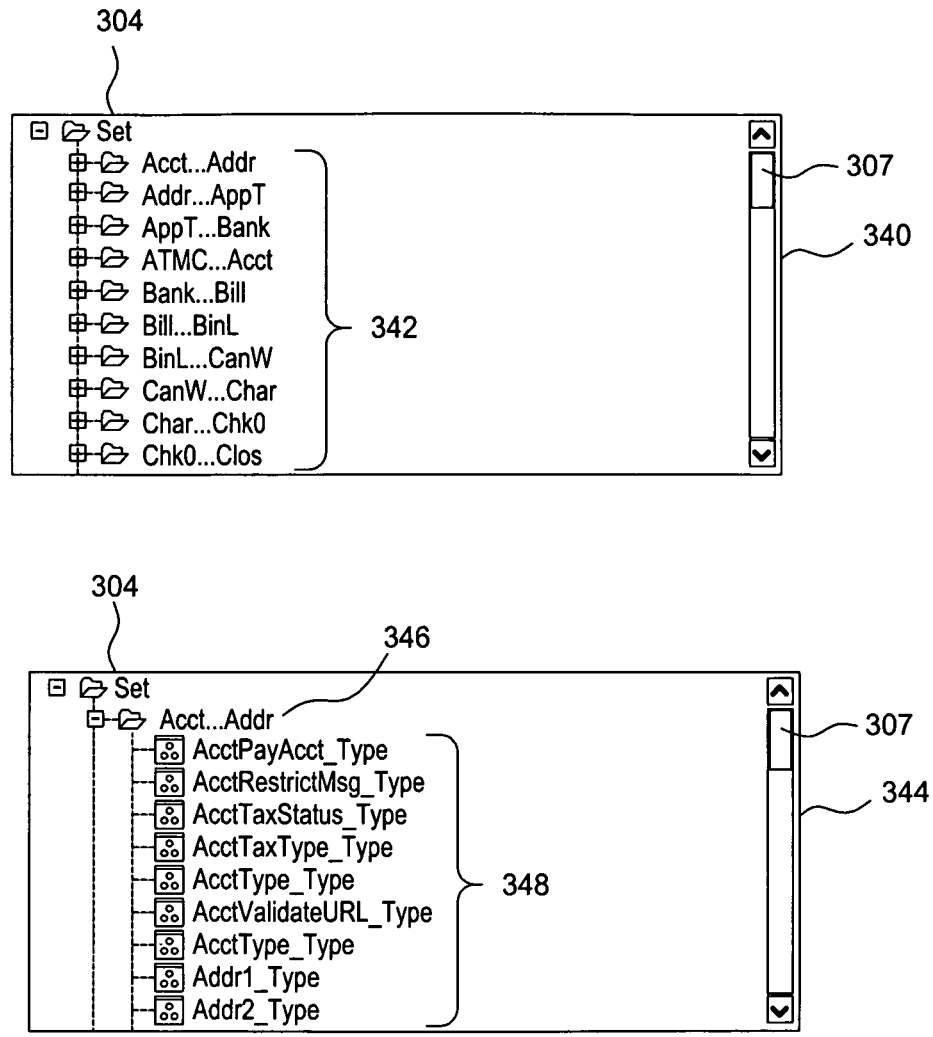

FIG. 3C shows a window 340 and a window 344. In this example, the object presenter 150 generates a label 342 for each category, based on a name of the objects in that category (e.g., "Acct . . . Addr", "Addr . . . AppT", etc.). The labels 342 convey information about the categories 342; namely, information describing what objects 348 are associated with any given category.

Figure 3D:
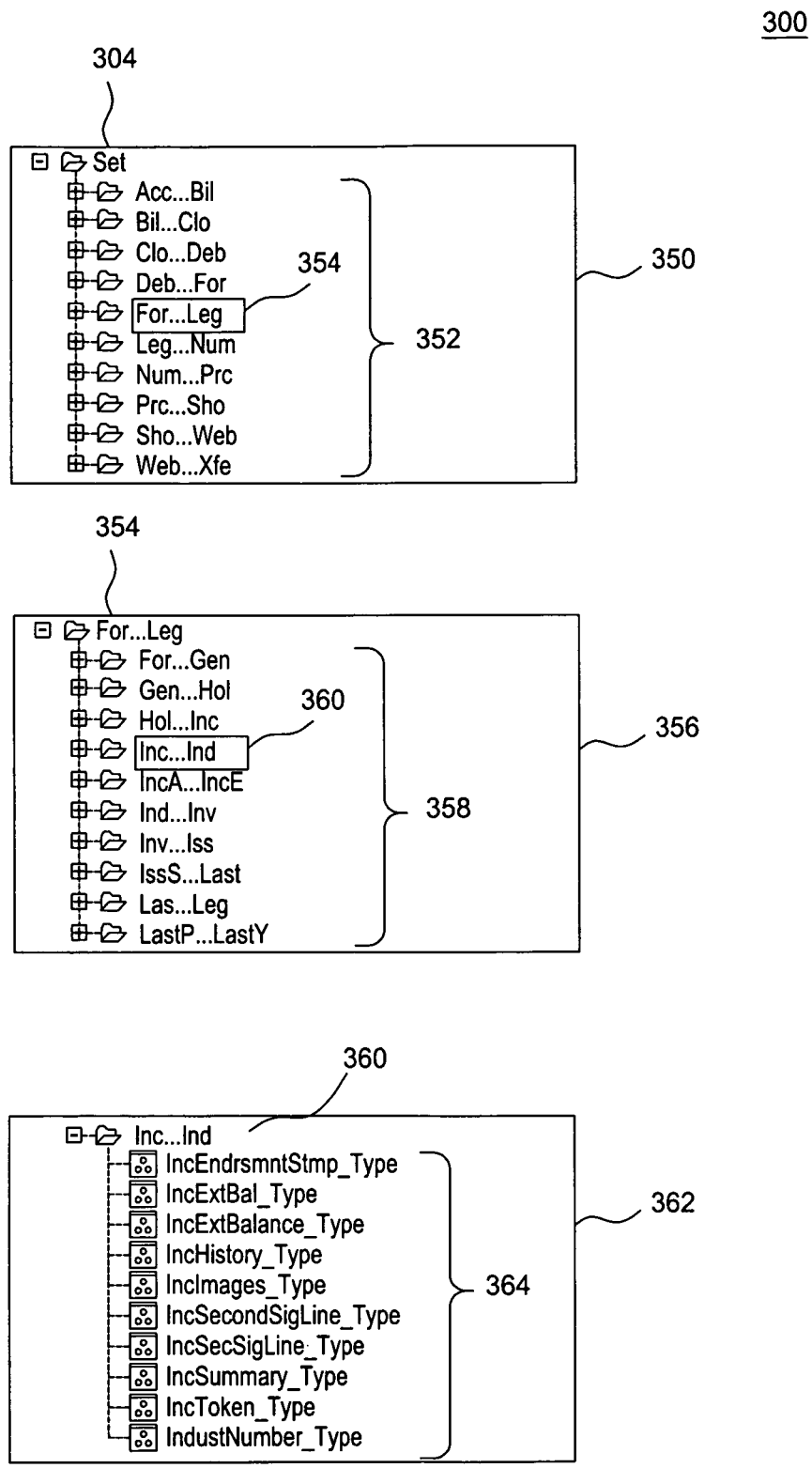

Referring now to FIG. 3D, the object presenter 150 may also generate a number of categories 352 (e.g., ten categories) that may be simultaneously displayed within a window 350, according to one embodiment. In this example, the categories generated to display elements of the large list may eliminate user scrolling (as shown by a lack of a scroll bar 307 in a window 350). Items in the list may be distributed in a variety of ways to reduce the number of categories to below that of the maximum number of rows (i.e., even distribution, uneven distribution, multiple levels of categories, etc.). Further, the object presenter 150 may generate labels 158 (e.g., "Acct . . . Bil", "Bil . . . Clo", etc.) for each category 352 based on the objects 364 represented by the respective category 352.

In one embodiment, the object presenter 150 may receive a user request to expand one of the categories (e.g., the category 354 labeled as "For . . . Leg"). In response, the object presenter 150 may generate sub-categories 358 for display within the window 350. The results of expanding the category 354 are shown in window 356. As shown, window 356 includes ten subcategories—a first subcategory of "For . . . Gen" through a tenth subcategory of "LastP . . . LastY." In one embodiment, the object presenter 150 allows the user to navigate through any number of levels of a hierarchy. Further, at each level, the object presenter may generate sub-categories to display subsets of the large list in a display window such that the number of categories presented at any level in the hierarchy matches the number of rows that may be displayed in the window. For example, the object presenter 150 may allow a user to request to expand one of the subcategories in window 356 (e.g., category 360 labeled as "Inc . . . Ind"). The results of such a request are shown in window 362. In this example, the subcategory labeled as "Inc . . . Ind" includes ten elements. Thus, the window 362 displays the actual ten elements—instead of additional subcategories.

In one embodiment, the object presenter 150 may provide a set of interface components 366 for viewing, navigating, and/or selecting the plurality of objects 152. For example, FIG. 3E illustrates a window 350 which displays a hierarchy that includes an expanded node 304 (labeled "Set") and a first level of categories 352. The expanded node 304 may also be referred to herein as the active node or the node having focus. In another embodiment, the root category of the hierarchy ("Set" in FIG. 3E) need not be generated. For example, the window 350 of FIG. 3E need not include a reference to the root level of list elements ("Set" in FIG. 3E). That is, as the interface is configured to present a dataset that is too large to be displayed at the root level, the reference to the root level element may be omitted. In such a case, the window itself acts as a container for the large set, without any labeling for the root element.

As shown in FIG. 3E, the window 350 has the interface control component 366 that allows a user to navigate the plurality of objects 152. For example, the object presenter 150 may associate the control components 368, 370, 372, 374, 376, 378, 380, with commands shown in Table V. The control components may also be referred to herein as "widgets." For example, referring to window 356, a user may click on a "move up" button 368 of the window 356 to expand the previous sibling of the active node (e.g., to expand "Deb . . . For" instead of "For . . . Leg" 354). Further, a user may click on button 372 of the window 356 to expand the next sibling of the active node (e.g., to expand the category labeled "Leg . . . Num" instead of the category labeled "For . . . Leg" 354). Similarly, if a user selects a category (e.g., the category 360 labeled "Inc . . . Ind"), the object presenter 150 may expand and present objects in that category—either additional subcategories or list elements. For example, window 362 shows the results of selecting the category 360 labeled as "Inc . . . Ind" in window 356. Further, if the user clicks on widget 368 of the window 362, the object presenter 150 may expand the previous sibling of the active node (e.g., expand the category labeled "Hol . . . Inc") and display associated objects 386 (as shown in window 382).

Figure 3F:
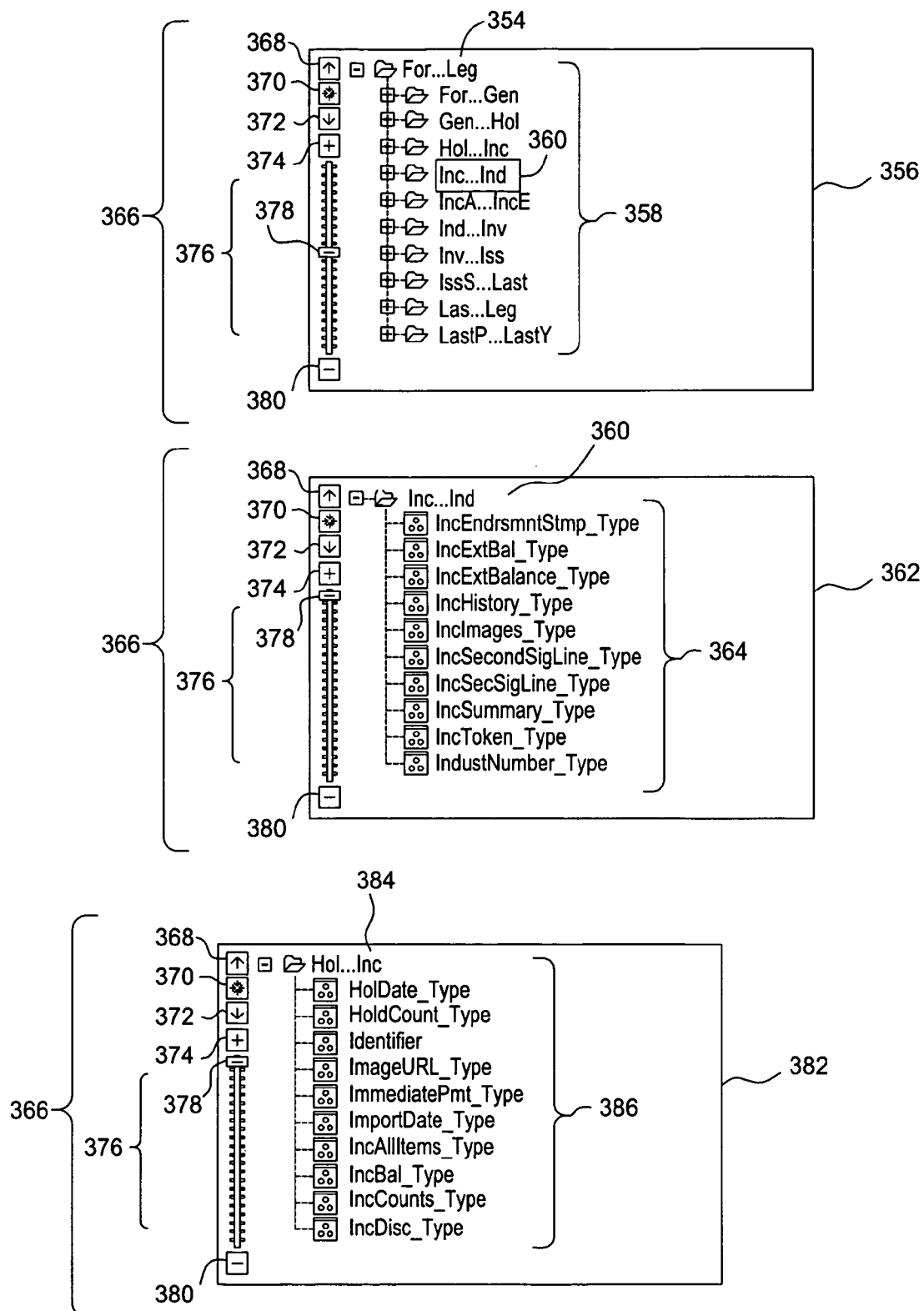

Window 356 of FIG. 3F shows elements at the "For . . . Leg" level of the hierarchy with the category 360 labeled "Inc . . . Ind" highlighted to indicate that this category currently has the focus of the interface. Thus, operations performed using the interface control components 366 operate on this selected subcategory. A user may also click on the slider widget 376 to move a slider 378 to a desired position on the slider widget 376, according to one embodiment. That is, the slider widget 376 includes a slider bar having a plurality of notches. Each notch may represent a level in the hierarchy. For example, the bottommost notch may represent the root level (Category "Set") of the hierarchy, while the topmost notch may represent the leaf level (objects 306, e.g., four levels deep in the hierarchy). As shown, a user may move the slider 378 from a bottommost position in the window 350 (to display children 352 of root category "Set" 304) to a middle position in the window 356 (to display children 358 of "For . . . Leg" 354) to a topmost position in the window 362 (to display child objects 360 of "Inc . . . Ind" 360).

Further, a user may also click on buttons 374, 380 to move the slider 378 to a desired position on the slider widget 376, according to one embodiment. For example, a user may click on a button 374 of the window 356 to move the slider 378 upwards on the slider widget 376, i.e., descend in the hierarchy (e.g., expand the category 360). If not category is currently selected, button 374 may be used to expand a category 358 at a predefined position, such as a middle category ("IncA . . . IncE" in this specific example). Descending in the hierarchy may also be referred to as "zooming in". In addition, a user may click on widget 380 to move the slider 378 downwards on the slider widget 376, i.e., ascend in the hierarchy (e.g., collapse "For . . . Leg" 354 and expand the parent Category, "Set" 304, as shown in window 350). Ascending in the hierarchy may also be referred to as "zooming out". Additionally, user may click on a button 370 of the window 356 to move the slider 378 to a lowest position on the slider widget 376, i.e., expand the highest level in the hierarchy (e.g., to expand the root Category, "Set" 304, as shown in window 350). Other widgets and commands may be supported by embodiments of the invention.

Figure 4:
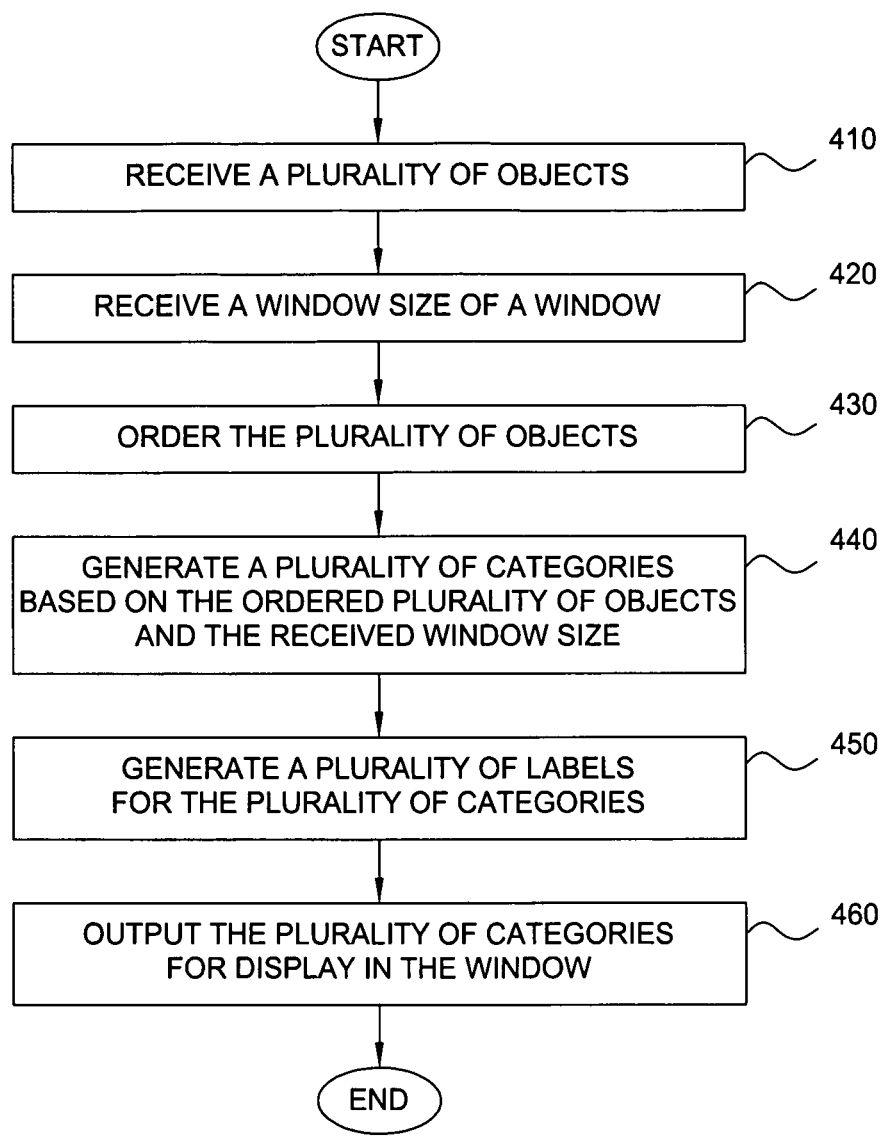
FIG. 4 is a flowchart depicting a method for presenting a plurality of objects within a window of specified size, according to one embodiment of the invention.

FIG. 4 is a flowchart illustrating a method 400 for presenting a plurality of objects 152 within a window of specified size 154, according to one embodiment of the invention. The method 400 may be performed by the object presenter 150 of FIG. 1. The steps of the method 400 are described in conjunction with the objects example of Table I, the window size example of ten rows, the categories example of Table II, the labels example of Table III, and the window 350 of FIG. 3.

As shown, the method 400 begins at step 410, where the object manager 210 receives a plurality of objects 152. For example, the object manager 210 may receive the plurality of objects of Table I. At step 420, the category manager 220 receives a window size 154, e.g., "320×200." At step 430, the object manager 210 may order the plurality of objects 152. For example, the object manager 210 may order the plurality of objects of Table I in alphabetical order.

At step 440, the category manager 220 generates a plurality of categories based on the ordered plurality of objects 152 and the received window size 154. For example, the category manager 220 may generate the plurality of categories of Table II. At step 450, the label manager 220 generates a plurality of labels 158 for the plurality of categories 156. For example, the label manager 220 may generate the plurality of labels of Table III. At step 460, the presentation manager 250 outputs the plurality of categories 156 for display in a window. For example, the presentation manager 250 may output the plurality of categories 352 for display in the window 350 of FIG. 3D.

Figure 5:
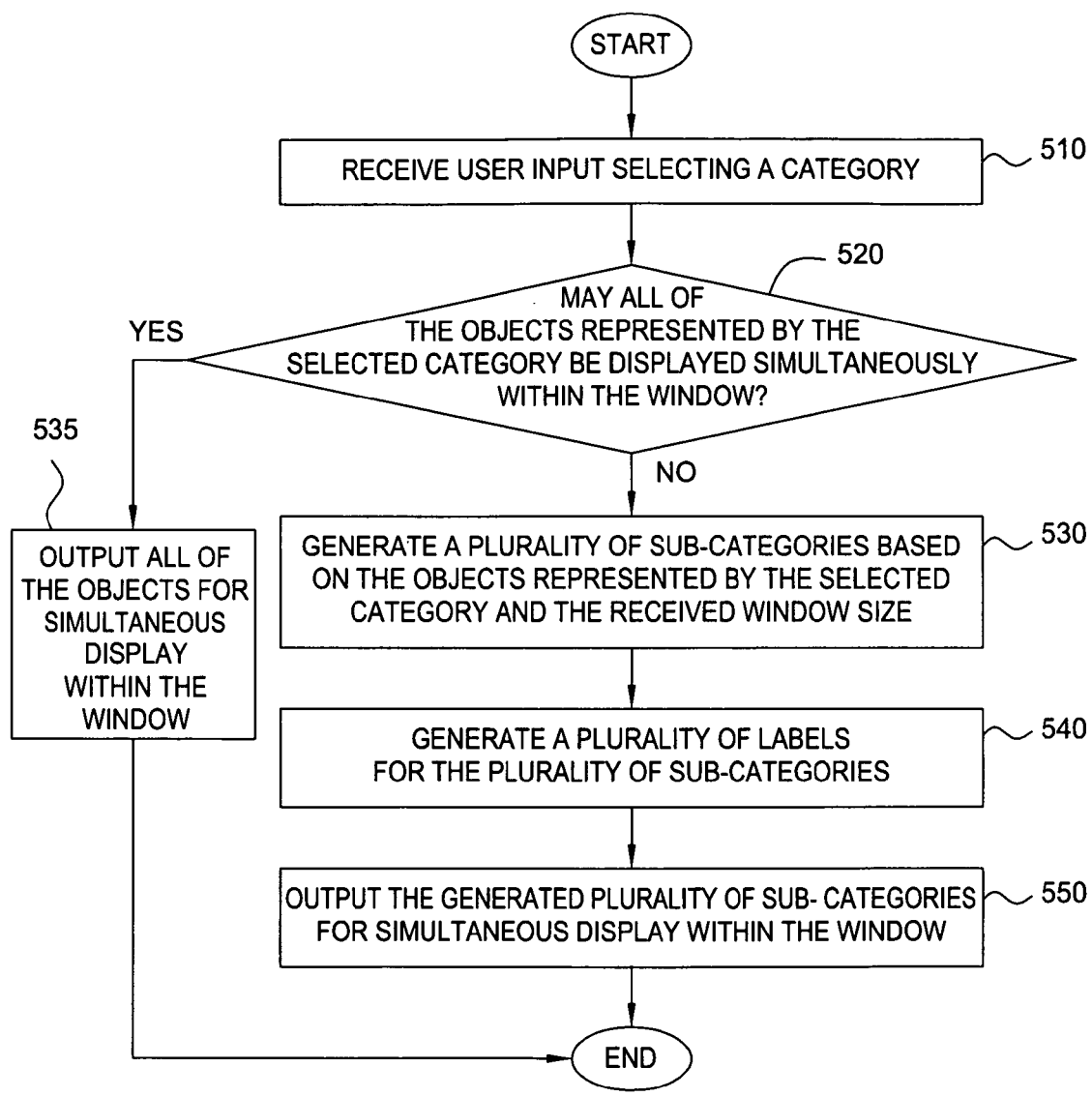
FIG. 5 is a flowchart depicting a method for navigating a plurality of objects in a window of specified size, according to one embodiment of the invention.

FIG. 5 is a flowchart illustrating a method for navigating a plurality of objects 152 in a window of specified size 154, according to one embodiment of the invention. The method 500 may be performed by the object presenter 150 of FIG. 1. The steps of the method 500 are described in conjunction with the sub-categories example of Table IV, the window 350 of FIG. 3D, and the window 362 of FIG. 3E.

As shown, the method 500 begins at step 510, where the navigation manager 240 receives user input selecting a category 156 in a window. For example, the navigation manager 240 may receive user input selecting the category 354 of the window 350 of FIG. 3D (i.e. the category labeled "For . . . Leg"). At step 520, the navigation manager 240 determines whether all of the objects 152 represented by the selected category 156 may be displayed simultaneously within the window. If so, the method 500 proceeds to step 535, where the presentation manager 250 outputs all of the objects 152 for simultaneous display within the window, after which the method 500 terminates. For example (supposing that a category "Inc . . . Ind" is selected), the presentation manager 250 may output the objects 364 for simultaneous display within the window 362 of FIG. 3D.

Otherwise, the method 500 proceeds to step 530, where the category manager 220 generates a plurality of sub-categories 156 based on the objects 152 represented by the selected category 156 and the received window size 154. For example, the category manager 220 may generate the plurality of sub-categories 358 based on the objects represented by the selected category 354 and the received window size for the window 350 of FIG. 3D. As a further example, the category manager 220 may generate the plurality of sub-categories of Table IV.

At step 540, the label manager 230 generates a plurality of labels 158 for the plurality of sub-categories 156. For example, the label manager 230 may generate the plurality of labels for the plurality of sub-categories 358 in window 356 of FIG. 3D (i.e., "For . . . Gen", "Gen . . . Hol", "Hol . . . Inc", . . . , "LastP . . . LastY"). At step 550, the presentation manager 250 outputs the generated plurality of sub-categories 156 for simultaneous display within the window. For example, the presentation manager 250 may output the generated plurality of sub-categories 358 for simultaneous display within the window 356 of FIG. 3D. After step 550, the method 500 terminates.

Figure 6:
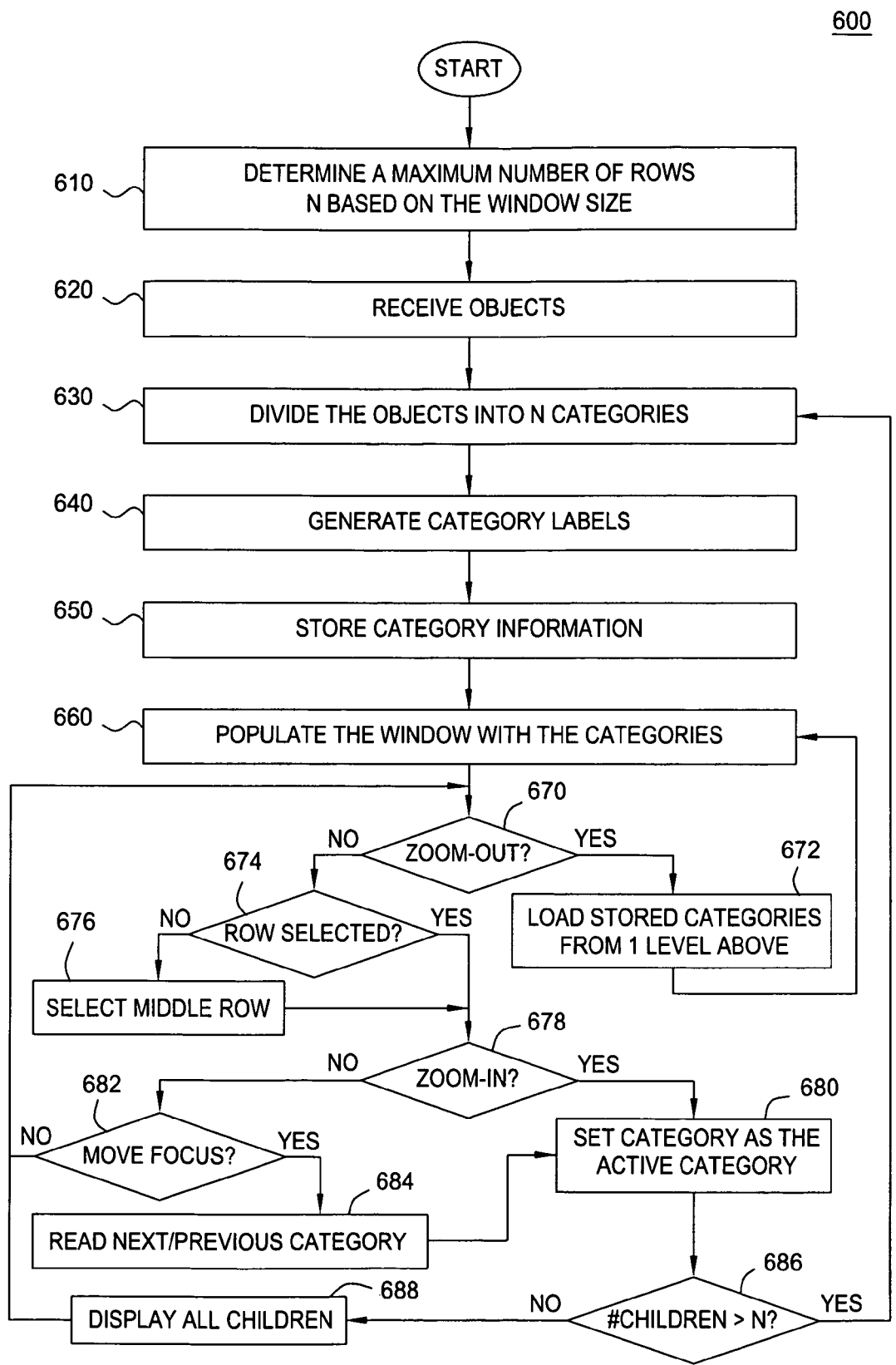
FIG. 6 is a flowchart depicting a method for presenting and navigating a plurality of objects within a window of specified size, according to one embodiment of the invention.

FIG. 6 is a flowchart illustrating a method 600 for presenting and navigating a plurality of objects 152 within a window of specified size 154, according to one embodiment of the invention. The method 600 may be performed by the object presenter 150 of FIG. 1. The steps of the method 600 are described in conjunction with the objects example of Table I, the maximum number of rows example of ten rows, the categories example of Table II, the labels example of Table III, and the GUI views 300 of FIGS. 3D-3F.

As shown, the method 600 begins at step 610, where the category manager 220 determines a maximum number of rows, N, based on the window size 154. For example, the category manager 220 may determine the maximum number of rows, based on text-character height and the size of the current display window. At step 620, the object manager 210 may receive a plurality of objects 152. For example, the object manager 210 may retrieve the plurality of objects 152 from the storage 108. As a further example, the object manager 210 may request the plurality of objects 152 (e.g., table names, such as those of Table I) from another computer (e.g., a database server) via the network 130. Responsive to the request, the database server may send the plurality of objects 152 to the object manager 210. In another embodiment, the object manager 210 may also execute on the database server. The object manager 210 executing on the database server may send only those of the plurality of objects 152 at the current focus level to the object manager 210 executing on the computer 102.

At step 630, the category manager 220 divides the objects 152 into categories 156. For example, the category manager 220 may divide the objects of Table I into the categories 156 of Table II. At step 640, the label manager 230 may generate labels 158 for the categories 156. For example, the label manager 230 may generate the labels of Table III.

At step 650, the category manager 220 may store category information. For example, the category manager 220 may store labels 158, categories 156, and associations (i.e., among categories and between categories and objects) into the storage 108. For instance, the category manager 220 may store the data of Table III onto a hard disk. The stored data may serve as a cache of category information to facilitate navigating through the hierarchy. At step 660, the presentation manager 250 populates the window with the categories 156. For example, the presentation manager 250 may populate the window 350 with the categories 352 of FIG. 3D.

At step 670, if the navigation manager 240 receives user input for zooming out, the method 600 proceeds to step 672, where the category manager 220 loads categories 156 from one level above in the hierarchy. For example, if a user clicks on the button 380 in window 356 of FIG. 3E, the category manager 220 may load categories 352. After step 672, the method 600 returns to step 660.

Otherwise, the method 600 proceeds to step 674. At step 674, if the navigation manager 240 does not receive user input for selecting a row, the method 600 proceeds to step 676, where the navigation manager 240 selects a middle row. For example, if a user does not select any row in window 350 of FIG. 3E, the navigation manager 240 may select a middle row (e.g., the row labeled "For . . . Leg" in window 350). After step 674 or step 676, the method 600 proceeds to step 678.

At step 678, if the navigation manager 240 receives user input for zooming in, the method 600 proceeds to step 680, where the navigation manager 240 sets the selected category 156 as the active category, i.e., the category to be expanded. The active category may also be referred to as the category in focus or the category in scope. For example, if a user clicks on the button 374 in the window 350 of FIG. 3E, the navigation manager 240 may set the category "For . . . Leg" as the active category. After step 680, the method proceeds to step 686, where the navigation manager 240 determines whether the number of associated children of the active category is greater than N (i.e., the maximum number of rows). If so, the method 600 returns to step 630. Otherwise, the method 600 proceeds to step 688, where the presentation manager 250 displays all children (i.e., categories or objects) of the active category. For example, the presentation manager 250 may display all categories 358 in window 356 of FIG. 3E. After step 688, the method 600 returns to step 670.

However, if the navigation manager 240 at step 678 does not receive user input for zooming in, the method 600 proceeds to step 682. At step 682, if the navigation manager 240 receives user input for moving focus (i.e., expanding the previous sibling node or the next sibling node of the active node), the method 600 proceeds to step 684, where the category manager 220 reads the next (or previous, depending on user input) category 156. For example, if a user clicks on the widget 368 in window 362 of FIG. 3F, the category manager 220 may read the previous category 384 (including associated nodes 386). After step 684, the method proceeds to step 680, where the category manager 220 sets the read category as the active category.

However, if the navigation manager 240 at step 682 does not receive user input for moving focus, the method 600 returns to step 670. Alternatively, the method 600 may also terminate.

Of course, the embodiments described herein are intended to be illustrative and not limiting of the invention, and other embodiments are broadly contemplated. Those skilled in the art will recognize, for example, that embodiments of the invention may be adapted to support other ways of generating categories, arranging categories into a hierarchy, generating labels, determining window size, determining maximum number of rows, defining commands, ordering objects, and distributing objects among categories.

Advantageously, embodiments of the invention presenting a plurality of objects within a display area on a graphical display device. In one embodiment, an object presenter may receive a plurality of objects and a size of the display area. The object presenter may generate a plurality of categories based on the plurality of objects and received size. The object presenter may also generate a plurality of labels for the generated plurality of categories, the labels describing the objects associated with each category. The plurality of categories may also form a hierarchy. The object presenter may also provide one or more commands for navigating the hierarchy. A user may conveniently and efficiently view, browse, and select the plurality of objects using the hierarchy and the provided commands.

While the foregoing is directed to embodiments of the present invention, other and further embodiments of the invention may be devised without departing from the basic scope thereof, and the scope thereof is determined by the claims that follow.

What is claimed is:

1. A computer-implemented method comprising:
    receiving a request to display a list of an ordered plurality of objects in a display window on a graphical display device, the display window having an insufficient size to display all of the objects in the list simultaneously, the display window having an associated slider bar having a plurality of notches;
    sorting the plurality of objects according to specified sort criteria to produce the ordered plurality of objects;
    determining a maximum number of elements which can be displayed simultaneously in the display window;
    generating a plurality of categories equal to the maximum number of elements which can be displayed simultaneously in the display window, wherein each of the generated plurality of categories is associated with a consecutive sequence of objects among the ordered plurality of objects;
    assigning, to each of the generated plurality of categories, a label indicative of both a first object and a last object of the consecutive sequence associated with the category;
    distributing each of the ordered plurality of objects to one of the generated plurality of categories;
    outputting, in response to the request, a list of the generated plurality of categories within the display window on the graphical display device;
    receiving a selection of one of the generated plurality of categories; and
    upon determining that a number of objects distributed to the selected category is greater than the maximum number of elements which can be displayed simultaneously in the display window, then, by operation of one or more computer processors:
        generating a plurality of sub-categories, the number of sub-categories being less than or equal to the maximum number of elements which can be displayed simultaneously in the display window, wherein the plurality of categories, the plurality of sub-categories, and the plurality of objects each belong to successively lower levels of a hierarchy of displayable elements, wherein each level of the hierarchy is represented by a different notch of the plurality of notches of the slider bar;
        distributing each of the ordered plurality of objects in the selected category to one of the generated plurality of sub-categories;
        outputting, in response to the selection of one of the plurality of categories, a list of the generated plurality of sub-categories within the display window on the graphical display device, thereby replacing the list of the generated plurality of categories within the display window;
        wherein the slider bar is controllable to cause displayable elements of a level of the hierarchy, that is represented by a specified notch, to be output within the display window of the graphical display device.

2. The computer-implemented method of claim 1, further comprising:
    receiving a selection of one of the generated plurality of categories; and
    upon determining that a number of objects distributed to the selected category is less than the maximum number of elements which can be displayed simultaneously in the display window, outputting the objects distributed to the selected category for display within the display window on the graphical display device.

3. The computer-implemented method of claim 1, wherein the display window has an associated button that can be activated to cause displayable elements belonging to a sibling member of a current level of the hierarchy, to be output within the display window of the graphical display device, wherein the sibling member is selected from a next sibling member and a previous sibling member.

4. The computer-implemented method of claim 1, wherein each of the plurality of categories has a substantially similar number of objects, wherein each of the plurality of sub-categories has a substantially similar number of objects.

5. The computer-implemented method of claim 1, wherein the maximum number of elements which can be displayed simultaneously in the display window is determined based on: (i) a size of the display window and (ii) height of a character set for output in the display window.

6. The computer-implemented method of claim 1, wherein the plurality of categories is generated by an application having a plurality of components, the plurality of components including an object manager, a category manager, a label manager, a navigation manager, and a presentation manager.

7. The computer-implemented method of claim 1, further comprising:
    in response to receiving a request to re-display the generated plurality of categories, replacing the list of the generated plurality of sub-categories with the list of the generated plurality of categories, within the display window on the graphical display device.

8. A computer program product comprising a computer-readable storage medium storing computer-usable program code executable to:
    receive a request to display a list of an ordered plurality of objects in a display window on a graphical display device, the display window having an insufficient size to display all of the objects in the list simultaneously, the display window having an associated slider bar having a plurality of notches;
    sort the plurality of objects according to specified sort criteria to produce the ordered plurality of objects, determine a maximum number of elements which can be displayed simultaneously in the display window;

generate a plurality of categories equal to the maximum number of elements which can be displayed simultaneously in the display window, wherein each of the generated plurality of categories is associated with a consecutive sequence of objects among the ordered plurality of objects;

assign, to each of the generated plurality of categories, a label indicative of both a first object and a last object of the consecutive sequence associated with the category;

distribute each of the ordered plurality of objects to one of the generated plurality of categories;

output, in response to the request, a list of the generated plurality of categories within the display window on the graphical display device;

receive a selection of one of the generated plurality of categories; and upon determining that a number of objects distributed to the selected category is greater than the maximum number of elements which can be displayed simultaneously in the display window, then, by operation of one or more computer processors when executing the computer-usable program code:

generate a plurality of sub-categories, the number of sub-categories being less than or equal to the maximum number of elements which can be displayed simultaneously in the display window, wherein the plurality of categories, the plurality of sub-categories, and the plurality of objects each belong to successively lower levels of a hierarchy of displayable elements, wherein each level of the hierarchy is represented by a different notch of the plurality of notches of the slider bar;

distribute each of the ordered plurality of objects in the selected category to one of the generated plurality of sub-categories, output, in response to the selection of one of the plurality of categories, a list of the generated plurality of sub-categories within the display window on the graphical display device, thereby replacing the list of the generated plurality of categories within the display window;

wherein the slider bar is controllable to cause displayable elements of a level of the hierarchy, that is represented by a specified notch, to be output within the display window of the graphical display device.

9. The computer program product of claim 8, wherein the computer-usable program code is further executable to:

receive a selection of one of the generated plurality of categories; and upon determining that a number of objects distributed to the selected category is less than the maximum number of elements which can be displayed simultaneously in the display window, output the objects distributed to the selected category for display within the display window on the graphical display device.

10. The computer program product of claim 8, wherein the display window has an associated button that can be activated to cause displayable elements belonging to a sibling member of a current level of the hierarchy, to be output within the display window of the graphical display device, wherein the sibling member is selected from a next sibling member and a previous sibling member.

11. The computer program product of claim 8, wherein each of the plurality of categories has a substantially similar number of objects, wherein each of the plurality of sub-categories has a substantially similar number of objects.

12. The computer program product of claim 8, wherein the maximum number of elements which can be displayed simultaneously in the display window is determined based on: (i) a size of the display window and (ii) height of a character set for output in the display window.

13. The computer program product of claim 8, wherein the plurality of categories is generated by an application having a plurality of components, the plurality of components including an object manager, a category manager, a label manager, a navigation manager, and a presentation manager.

14. The computer program product of claim 8, wherein the computer-usable program code is further executable to:

in response to receiving a request to re-display the generated plurality of categories, replacing the list of the generated plurality of sub-categories with the list of the generated plurality of categories, within the display window on the graphical display device.

15. A system comprising:

one or more computer processors; and a memory containing a program, which when executed by the one or more computer processors performs an operation comprising:

receiving a request to display a list of an ordered plurality of objects in a display window on a graphical display device, the display window having an insufficient size to display all of the objects in the list simultaneously, the display window having an associated slider bar having a plurality of notches;

sorting the plurality of objects according to specified sort criteria to produce the ordered plurality of objects;

determining a maximum number of elements which can be displayed simultaneously in the display window;

generating a plurality of categories equal to the maximum number of elements which can be displayed simultaneously in the display window, wherein each of the generated plurality of categories is associated with a consecutive sequence of objects among the ordered plurality of objects;

assigning, to each of the generated plurality of categories, a label indicative of both a first object and a last object of the consecutive sequence associated with the category;

distributing each of the ordered plurality of objects to one of the generated plurality of categories;

outputting, in response to the request, a list of the generated plurality of categories within the display window on the graphical display device;

receiving a selection of one of the generated plurality of categories; and upon determining that a number of objects distributed to the selected category is greater than the maximum number of elements which can be displayed simultaneously in the display window:

generating a plurality of sub-categories, the number of sub-categories being less than or equal to the maximum number of elements which can be displayed simultaneously in the display window, wherein the plurality of categories, the plurality of sub-categories, and the plurality of objects each belong to successively lower levels of a hierarchy of displayable elements, wherein each level of the hierarchy is represented by a different notch of the plurality of notches of the slider bar;

distributing each of the ordered plurality of objects in the selected category to one of the generated plurality of sub-categories;

outputting, in response to the selection of one of the plurality of categories, a list of the generated plurality of sub-categories for a second display within the display window on the graphical display device, thereby replacing the list of the generated plurality of categories;

wherein the slider bar is controllable to cause displayable elements of a level of the hierarchy, that is represented by a specified notch, to be output within the display window of the graphical display device.

16. The system of claim 15, wherein the operation further comprises:

receiving a selection of one of the generated plurality of categories; and upon determining that a number of objects distributed to the selected category is less than the maximum number of elements which can be displayed simultaneously in the display window, outputting the objects distributed to the selected category for display within the display window on the graphical display device.

17. The system of claim 15, wherein the display window has an associated button that can be activated to cause displayable elements belonging to a sibling member of a current level of the hierarchy, to be output within the display window of the graphical display device, wherein the sibling member is selected from a next sibling member and a previous sibling member.

18. The system of claim 15, wherein each of the plurality of categories has a substantially similar number of objects, wherein each of the plurality of sub-categories has a substantially similar number of objects.

19. The system of claim 15, wherein the maximum number of elements which can be displayed simultaneously in the display window is determined based on: (i) a size of the display window and (ii) height of a character set for output in the display window.

20. The system of claim 15, wherein the plurality of categories is generated by an application having a plurality of components, the plurality of components including an object manager, a category manager, a label manager, a navigation manager, and a presentation manager.

21. The system of claim 15, wherein the operation further comprises:

in response to receiving a request to re-display the generated plurality of categories, replacing the list of the generated plurality of sub-categories with the list of the generated plurality of categories, within the display window on the graphical display device.

* * * * *